S. H. HEIST.
METHOD OF MAKING HOLLOW ARTICLES.
APPLICATION FILED SEPT. 13, 1921.
1,402,293.
Patented Jan. 3, 1922.
3 SHEETS—SHEET 3.
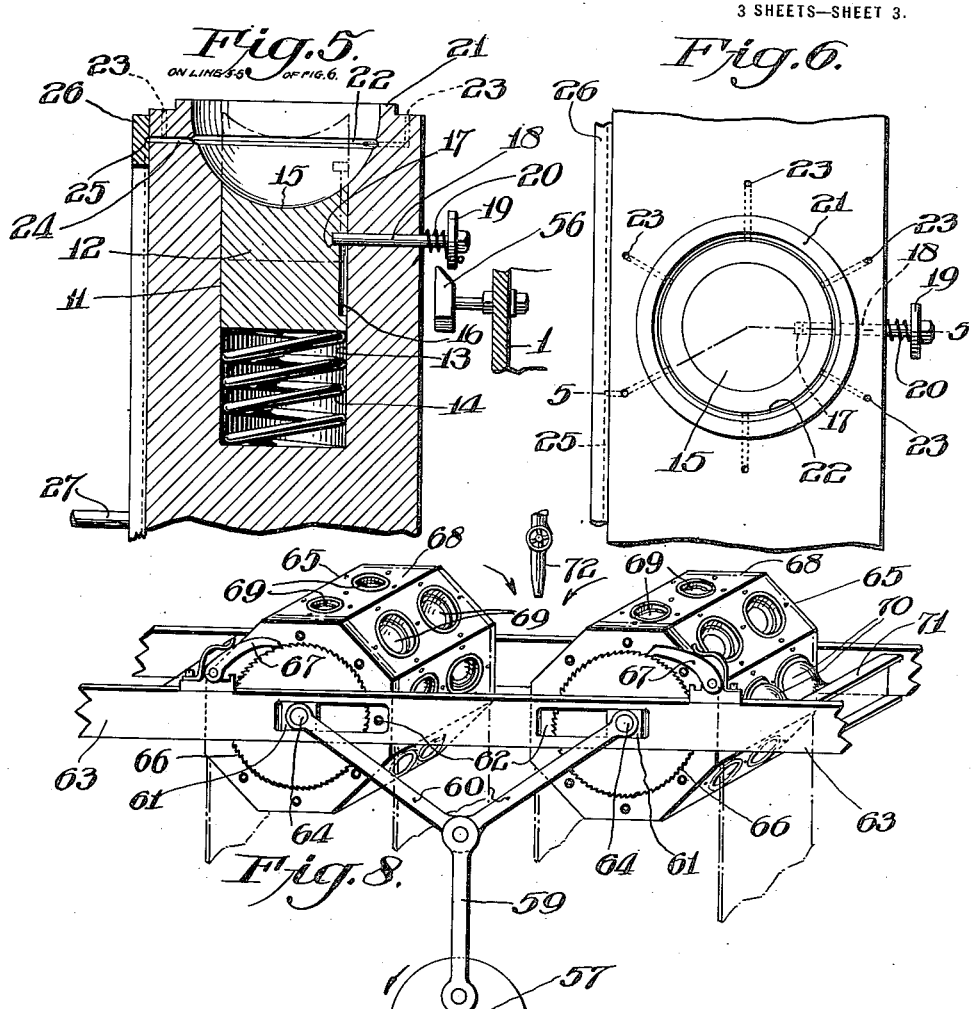
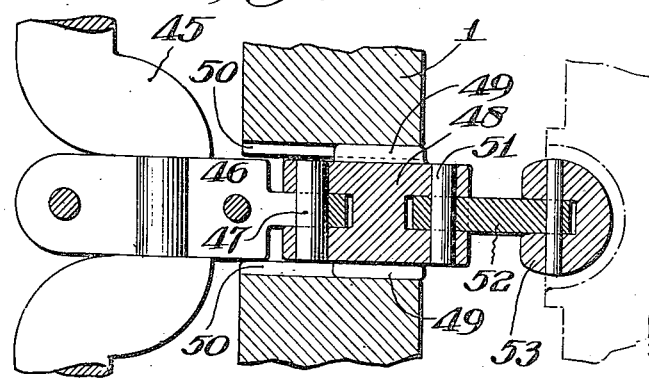
INVENTOR
Stuart H. Heist.
BY
ATTORNEYS

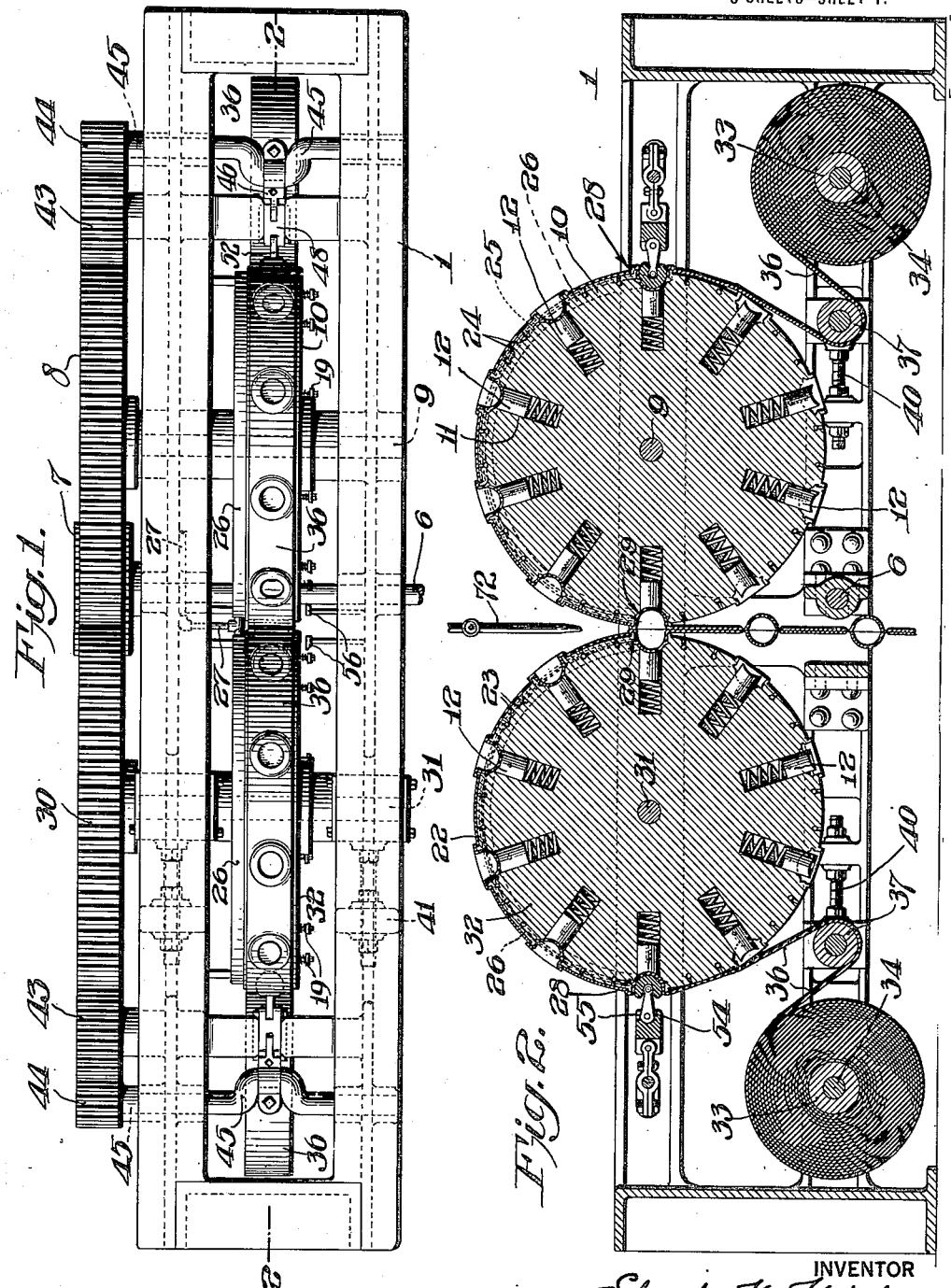

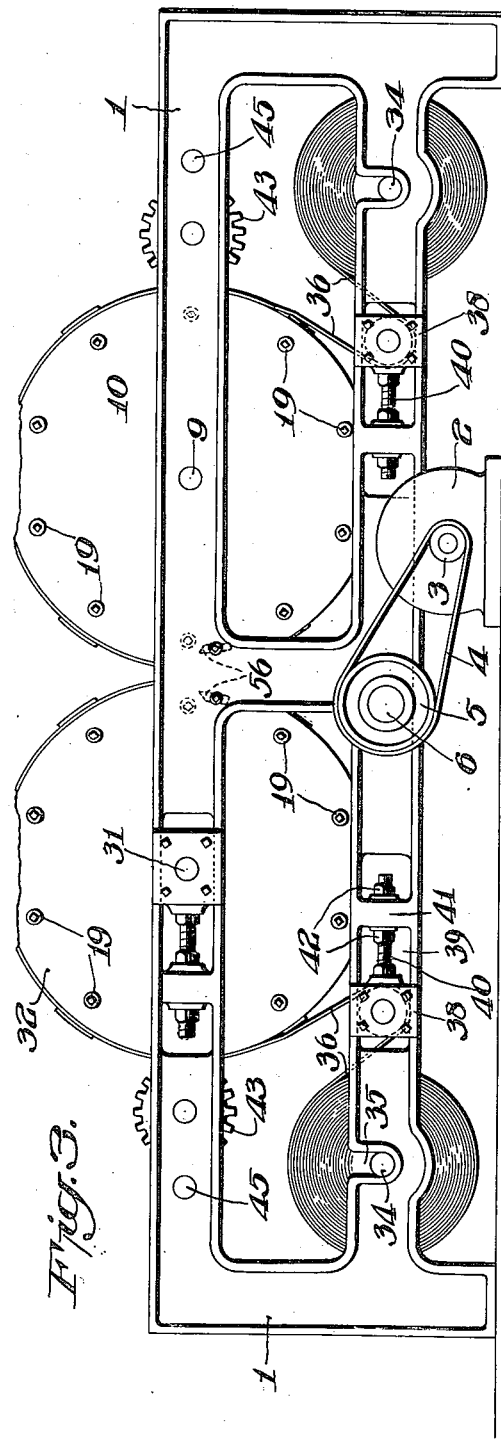

UNITED STATES PATENT OFFICE.

STUART H. HEIST, OF PENLLYN, PENNSYLVANIA, ASSIGNOR TO PENN RUBBER PRODUCTS CORPORATION, OF PHILADELPHIA, PENNSYLVANIA, A CORPORATION OF DELAWARE.

METHOD OF MAKING HOLLOW ARTICLES.

1,402,293.      Specification of Letters Patent.      Patented Jan. 3, 1922.

Application filed September 13, 1921. Serial No. 500,446.

*To all whom it may concern:*

Be it known that I, STUART H. HEIST, a citizen of the United States, residing at Penllyn, county of Montgomery, State of Pennsylvania, have invented a new and useful Method of Making Hollow Articles, of which the following is a specification.

My invention comprehends a novel method of making hollow articles from plastic material which is preferably in sheet form.

It further comprehends a novel method of making hollow articles wherein the plastic stock in sheet form passes around molds having mold cavities in their periphery, so that during the rotation of the molds the articles are formed in sections and an expansible medium introduced into the sections prior to the sealing of their juxtaposed edges. so that the biscuits are automatically formed without requiring any attention on the part of the operator except to see that the machine is supplied with plastic stock.

It further comprehends a novel method of making hollow articles wherein the plastic stock in sheet form passes around cooperating rotatable molds having mold cavities into which the stock is mechanically moved and wherein during the rotation of the molds the juxtaposed edges of article sections are sealed, and if desired the articles ejected from the mold cavities.

After the articles or biscuits have been formed, they are transferred to a vulcanizing mold in which they are vulcanized.

My invention further comprehends a novel apparatus for making hollow articles of the plugged or plugless type.

Other novel features of construction and advantage will hereinafter more fully appear in the detailed description.

For the purpose of illustrating my invention, I have shown in the accompanying drawings typical embodiments thereof which are at present preferred by me, since these embodiments will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of an apparatus for making hollow articles, embodying my invention, and by means of which my novel method can be carried out in practice.

Figure 2 represents a section on line 2—2 of Figure 1.

Figure 3 represents an elevation of one side of the machine.

Figure 4 represents an elevation of the opposite side of the machine.

Figure 5 represents a section through one of the mold cavities.

Figure 6 represents a top plan view of Figure 5 with the stationary cam omitted.

Figure 7 represents, in section and on an enlarged scale, one of the forming members and certain of its adjuncts.

Figure 8 represents, in perspective, another embodiment of my invention.

Similar numerals of reference indicate corresponding parts.

Referring to the drawings:

1 designates the frame of the machine. 2 designates an electric or other motor, the shaft of which is provided with a pulley 3 around which passes a belt 4 which also passes around a pulley 5 on the main driving shaft 6 which is suitably journalled in the machine frame. The driving shaft 6 has fixed thereon a gear 7 which meshes with a gear 8 which is secured to a shaft 9 which carries a rotatable mold 10 provided in its periphery with a desired number of mold cavities 11 which are preferably integral with the mold. For convenience of illustration, I have shown a single cavity in a row, but in practice each row may be provided with any desired number of mold cavities Each mold cavity 10 is provided with an aperture in its bottom wall through which is adapted to extend at certain times an anvil 12, see more particularly Figure 5, said anvil being slidably mounted in an aperture 13 in its respective mold. The anvil 12 is normally moved outwardly into its respective cavity by means of a spring 14 interposed between the anvil 12 and the inner wall of the aperture 13. The outer end of an anvil 12 may be shaped to conform to a wall of the cavity and forms a part of the wall of the mold cavity and, as illustrated, it is curved as at 15. I provide means for locking the anvil 12 in its inward position at certain stages of the operation and, for this purpose, a wall of the anvil 12 is provided with a recess 16 which at its outer end forms a shoulder 17, with which co-operates a locking plunger 18 which is slidably mounted in its respective mold. Each plunger 18 is provided with a head 19 and with a spring 20 which tends to move the plunger 18 inwardly. Each mold cavity 11 is surrounded by a seaming edge or wall 21 which extends outwardly beyond the periphery of the mold. Each mold cavity 11 is provided with an annular groove 22 which communicates with ports 23 opening through the outer periphery of the mold around the mold cavity. A passage 24 communicates with a groove 22 of a mold cavity and with a groove 25 in a plate 26, and a vacuum pipe 27 is provided, which communicates with the groove 25 and with a source of suction supply (not shown). The suction plate 26, as will be understood by reference to Figure 2, extends substantially half way around an end of the roll 10 and the inlet terminal of the groove 25 is substantially as indicated at 28, see Figure 2, and its other terminal or point of cut off is substantially as indicated at 29. It will be understood that this plate 26 is stationarily supported by the frame 1 in any desired manner.

The gear 8, see Figures 1 and 4, meshes with a gear 30 mounted on a shaft 31 journalled in the machine frame and mounted on this shaft 31 is a rotatable mold 32 which is a counterpart of the rotatable mold 10. The plastic stock in sheet form from its source of production is assembled on rolls 33, the shafts 34 of which are removably carried by the frame 1, the frame being recessed, as at 35 for this purpose. The sheets 36 passing from the rolls pass around take-up rolls 37 which are journalled in boxes 38 slidably mounted in the guide-ways 39 of the machine frame and provided with the threaded rods 40 which pass through the fixed portions 41 of the frame and are provided with adjusting nuts 42 whereby the take-up rolls 37 may be laterally adjusted, as desired. The sheets 36 then pass around their respective molds 10 and 32, as will be understood by reference to Figure 2. The gears 8 and 30 mesh with idlers 43 which in turn mesh with gears 44 mounted on the crank shafts 45 journalled in the machine frame. Each crank shaft 45, see more particularly Figures 1, 2 and 7, is provided with a connecting rod 46 which is pivotally connected at 47 with a slide 48 slidably mounted in the frame and having keys 49 which travel in the key-ways 50. Each slide 48 has pivotally connected to it at 51 a rod 52 to which is connected, in any desired manner, a male forming die 53. The slide 48 is provided with a laterally extending shoulder 54, see Figure 2, which limits the downward movement of a male forming die 53 and the upward movement of such male forming die 53 is permitted through the recess or cut-away portion 55 in a slide 48.

I provide stationary cams 56, see more particularly Figures 3 and 5, which are carried by the frame and located in such position so that at the proper time the plungers 18 will be moved outwardly to effect the release of their respective anvil 12. It will be understood that I employ a male forming die and its adjuncts to co-operate with each rotatable mold as its mold cavities are brought into register with such male forming die.

In the embodiment just described, the rotatable molds are continuously driven, while in the embodiment seen in Figure 8, to which attention is now directed, the molds are intermittently rotated, and provision is made for moving them toward and away from each other during the operation. In this embodiment 57 designates a driving shaft carrying a disc 58 to which is eccentrically connected one end of a link 59, the opposite end of which is pivotally connected to the links 60, which in turn, are pivotally connected to the journal boxes 61 slidable in the slots 62 of the machine frame 63. The shafts 64 which carry the molds 65 are each provided with a ratchet 66 with which co-operate the spring pressed pawls 67 which are pivotally carried by the machine frame at such locations that when the molds 65 are moved outwardly they will be partially rotated by the pawls 67. In this embodiment, instead of the rolls being in circular formation they are polygonal, and, as shown, they are in the form of an octagon, each face 68 of which is provided with mold cavities 69, and, for purpose of illustration, I have shown two mold cavities on each face 68, it being understood that the number will vary in accordance with the size of the articles which are to be made. In this embodiment seen in Figure 8, the male forming dies 70 have their supporting rods pivotally supported at 71 to a stationary portion of the machine frame.

It will be understood that the sheets of plastic stock are fed around the rotatable molds in a similar manner to that illustrated in Figure 2, and, in each embodiment of my invention, I may provide if desired, a controllable pipe 72 through which a medium which will expand under heat is inserted into an article section, so that when it is being vulcanized it will expand against the wall of the vulcanizing mold.

The operation of my novel method of and apparatus for making hollow articles will now be apparent to those skilled in the art to which this invention appertains and is as follows:—

Referring first to the embodiment seen in Figures 1 to 7 inclusive, it will be apparent from the drawings that the main driving shaft 6 is driven by the motor 2, which in turn, through the gears 7 and 8, effects the revolution of the rotatable mold 10 and as the shaft of this mold 10 is intergeared with the shaft of the co-operating mold 32, the rotatable molds 10 and 32, respectively, will be moved in opposite directions. The plastic stock in the form of sheets 36 passes over the molds 10 and 32, respectively, and the parts are so timed that when a mold cavity of its respective mold registers with a male forming die 53, said die is moved forwardly since the crank shaft 45 is driven by the gears 44, 43 and the gears carried by the shafts on which the rotatable molds are mounted. This causes the plastic stock to be seated in the mold cavities, and after the stock has moved into the mold cavities, the suction is automatically applied through the port 28, through the suction groove 25, passage 24, annular groove 22 of the mold cavity and the ports 23 opening through the periphery of the mold. The suction remains on until the formed article sections approach the point at which they are seamed, the suction being cut off due to the location of the port 29 when the seaming operation takes place. The two rotatable molds are so arranged that the seaming operation takes place by the rolling contact of the raised wall surrounding the two mold cavities.

Prior to this seaming operation a medium which will expand during the action of vulcanization is manually or mechanically introduced into an article section through the pipe 72, which would preferably be automatically timed and controlled.

The formed articles are next placed in a vulcanizing mold and vulcanized. If desired, a plug may be automatically inserted into an article section prior to the seaming of an article, for example, as disclosed in my copending application Serial No. 486,998. It will be seen that as the male forming die passes into a mold cavity, the polar region of an article section will be resiliently supported between the male die and the anvil, so that most of the stretch takes place on the side wall of a mold cavity instead of at the bottom thereof. As soon as an anvil 12 reaches the position seen in Figure 5, the spring 20 will force inwardly the plunger 18 so that it engages the shoulder 17 and locks the anvil 12 in its inward position. The anvil 12 stays in this position until the head 19 of a plunger 18 comes into contact with a stationary cam 56, which causes the plunger 18 to move outwardly sufficiently to permit the spring 14 to move the anvil 12 outwardly into its mold cavity, its outward movement being limited by the inner wall of the recess 16, see Figure 5.

The rotatable rolls are continuously traveling, and in order to provide for the proper return movement of the male forming members 53, the slides 48 are recessed, as at 55, and are provided with the shoulders 54 which limit the downward movement of the rods 52 which carry the male forming members so that the male forming dies 53 will always be in proper alignment when the mold cavities register therewith.

In the embodiment seen in Figure 8, instead of depending upon the rolling contact of the rotatable molds, I effect, at the time of the seaming operation, relative lateral movement between the molds and, as shown, I laterally move both rolls although, as is apparent, only one of these need be moved, the other being stationary.

As the shaft 57 revolves, it will be apparent that at the proper time the molds 65 will be moved rearwardly so that the pawls 67 will effect a partial revolution of such molds, step by step, as the operation is carried on. As the molds move outwardly the male dies 70 form the plastic stock in the cavities, and the suction is then applied in a similar manner to that described in conjunction with other figures of the drawings to retain the formed sections in their mold cavities until the seaming operation is completed. As the rotatable molds 65 are brought together, the raised walls surrounding the mold cavities will effect the seaming by pressure of the juxtaposed edges of article sections. Prior to the seaming a medium which will expand under the action of vulcanization can be introduced into an article section in any desired manner, as already explained, and if desired a plug can be inserted into an article section prior to the seaming operation.

It is to be understood that where in the claims I specify "mechanically forming or seating" the plastic stock in the cavities of rotatable molds, I do not intend to have such expression construed as covering an operation wherein the plastic stock is formed in the mold cavities by fluid pressure above, at or below atmospheric pressure contacting directly with the plastic stock.

It will now be apparent that I have devised a novel and useful method of making hollow articles which embodies the features of advantage enumerated as desirable in the statement of the invention and the above description, and while I have, in the present instance, shown and described embodiments thereof which will give in practice satisfactory and reliable results, it is to be understood that such embodiments are susceptible of modification in various particu-

Having thus described my invention what I claim as new and desire to secure by Letters Patent, is:

1. The method of making hollow articles, which consists in mechanically seating the stock in mold cavities of rotatable molds to form article sections and seaming the edges of article sections by co-operation between the molds.

2. The method of making hollow articles, which consists in mechanically seating the stock in mold cavities of rotatable molds to form article sections, retaining the formed sections in the cavities by suction and seaming the edges of article sections by co-operation between the molds.

3. The method of making hollow articles, which consists in mechanically seating the stock while resiliently supporting the polar regions in mold cavities of rotatable molds to form article sections and seaming the edges of article sections by co-operation between the molds.

4. The method of making hollow articles, which consists in mechanically forming the stock in mold cavities of rotatable molds against the resilient action of an anvil, locking the anvil in its inward position after the stock is formed, and seaming the edges of juxtaposed article sections by the co-operation of the molds.

5. The method of making hollow articles, which consists in mechanically forming the stock in mold cavities of rotatable molds against the resilient action of an anvil, locking the anvil in its inward position after the stock is formed, seaming the edges of juxtaposed article sections by the co-operation of the molds, and releasing the anvil to eject the article from its mold cavities.

6. The method of making hollow articles, which consists in mechanically seating the stock in mold cavities of rotatably mounted molds, retaining the formed stock in such cavities, and effecting relative movement of the molds to bring complementary cavities into register and to seam the juxtaposed edges of article sections.

7. The method of making hollow articles, which consists in mechanically seating the stock in mold cavities of rotatably mounted molds, retaining the formed stock in such cavities, securing a sealing plug to one of the formed sections, and effecting relative movement of the molds to bring complementary cavities into register and to seam the juxtaposed edges of article sections.

8. The method of making hollow articles, which consists in continuously revolving juxtaposed rotatable molds, to feed plastic stock in sheet form over their peripheries and between them, mechanically forming the stock in the mold cavities of the molds during their revolution, retaining the formed stock in the cavities by suction, and seaming the edges of complementary sections by the rolling contact of the molds.

9. The method of making hollow articles, which consists in continuously revolving juxtaposed rotatable molds, to feed plastic stock in sheet form over their peripheries and between them, mechanically forming the stock in the mold cavities of the molds during their revolution, retaining the formed stock in the cavities by suction, releasing the suction prior to seaming the edges of complementary article sections, and seaming the edges of complementary sections by the rolling contact of the molds.

10. The method of making hollow articles, which consists in continuously revolving juxtaposed rotatable molds, to feed plastic stock in sheet form, over their peripheries and between them, mechanically forming the stock in the mold cavities of the molds during their revolution, retaining the formed stock in the cavities by suction, seaming the edges of complementary sections by the rolling contact of the molds, and lastly vulcanizing the former articles.

11. The method of making hollow articles, which consists in continuously revolving juxtaposed rotatable molds, to feed plastic stock in sheet form over their peripheries and between them, mechanically forming the stock in the mold cavities of the molds during their revolution, retaining the formed stock in the cavities by suction, introducing a medium into an article section which will expand under the action of vulcanization, seaming the edges of complementary sections by the rolling contact of the molds, and lastly vulcanizing the formed articles.

12. The steps in the making of hollow articles, which consist in mechanically forming plastic stock in a cavity of a rotating mold, and retaining the formed stock in such cavity by suction during the rotation of the mold.

13. The method of making hollow articles, which consists in mechanically forming the stock in the cavities of juxtaposed rotatable molds, automatically applying suction to retain the formed sections in said cavities, automatically releasing the suction, and seaming the edges of complementary article sections by the co-operation between said molds.

14. The method of making hollow articles from plastic sheet stock, which consists in seating the plastic stock in the cavities of rotatable molds by means of a preponderance of pressure mechanically exerted against the sheet stock and retaining the formed stock in the cavities during the rotation of the molds by permitting the air to exhaust from such cavities.

15. The method of making hollow articles from plastic stock, which consists in effecting relative movement between a male forming member and plastic stock passing around a rotatable mold to form the stock around the male forming member, and maintaining the formed stock in its formed condition by fluid pressure.

16. The method of making hollow articles, which consists in forming hollow article sections from continuously travelling plastic stock by means of a preponderance of pressure mechanically applied to one side of the traveling stock, and sealing the juxtaposed edges of complementary article sections.

STUART H. HEIST.

Witnesses:
H. S. FAIRBANKS,
C. D. McVAY.